United States Patent [19]

Allen

[11] Patent Number: 4,955,489
[45] Date of Patent: Sep. 11, 1990

[54] STORAGE RACK SYSTEM

[75] Inventor: Donald R. Allen, Frenchtown, N.J.

[73] Assignee: Frazier Industrial Company, Long Valley, N.J.

[21] Appl. No.: 233,122

[22] Filed: Aug. 12, 1988

[51] Int. Cl.⁵ .............................................. A47F 5/00
[52] U.S. Cl. .................................. 211/151; 211/59.2; 211/162; 414/276
[58] Field of Search ...................... 211/151, 162, 59.2; 414/276, 286

[56] References Cited

U.S. PATENT DOCUMENTS

| | | | |
|---|---|---|---|
| 4,341,313 | 7/1982 | Doring | 211/151 |
| 4,462,500 | 7/1984 | Konstant et al. | 211/151 |
| 4,613,270 | 9/1986 | Konstant et al. | 414/276 |
| 4,773,546 | 9/1988 | Konstant | 211/151 |

OTHER PUBLICATIONS

Brochure or Frazier Industrial Company, entitled "The New Concept in Order-Picking Systems", dated 1961.
Brochure of Speedrack Inc., entitled "Speed Cart", dated 1982.
Brochure of Interroll Corporation, entitled "Stackrail", dated 1987.
Pamphlet of Interlake Company, entitled "Push Back Rail", dated 1988.
Pamphlet of Warehouse Storage Systems Co., entitled "HIPIR Kart", dated 1986.

Primary Examiner—Robert W. Gibson, Jr.
Attorney, Agent, or Firm—Joseph W. Molasky & Assocs.

[57] ABSTRACT

A storage rack system having a plurality of storage bays adapted to store pallet loads of three pallets deep is disclosed. Each of the storage bays includes a pair of tracks having a lower cart and an upper cart movable along the tracks between a forward position and a back position. The forward positions of both the lower cart and the upper cart are located at the entry end of the storage bay, the back position of the lower cart is located two pallets deep from the entry end of the storage bay and the back position of the upper cart is located three pallets deep from the entry end of the storage bay. Storage rack systems adapted to store pallet loads of four pallets deep are also disclosed.

14 Claims, 10 Drawing Sheets

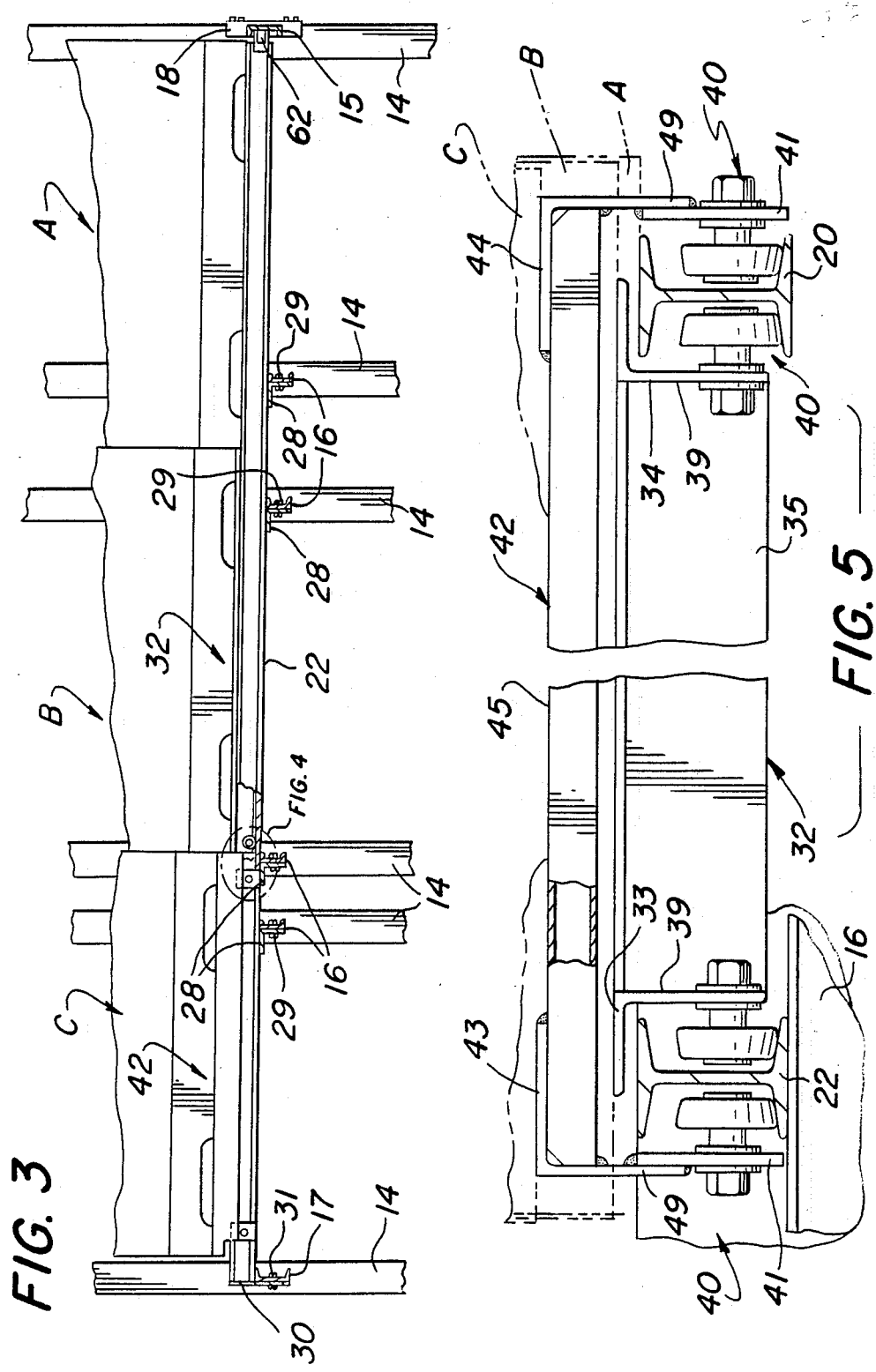

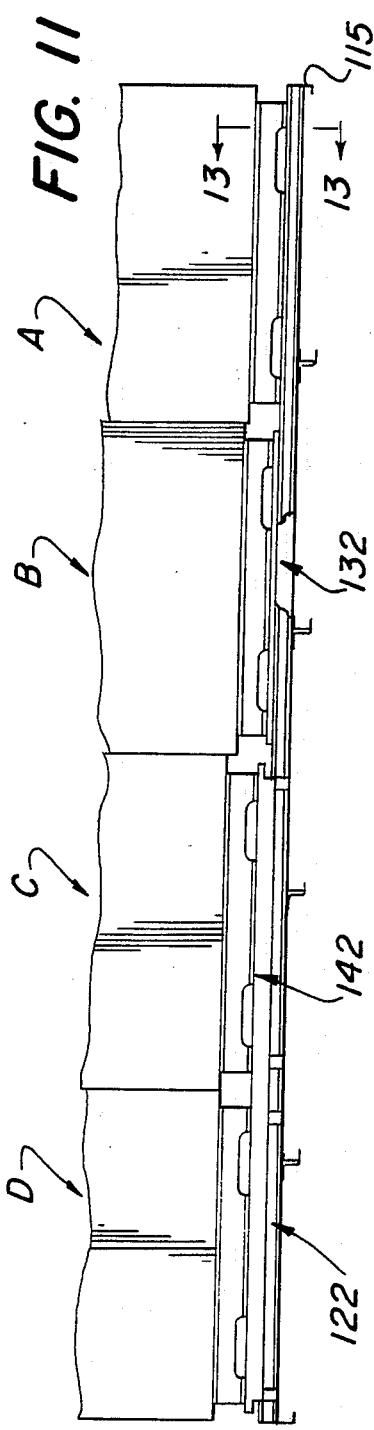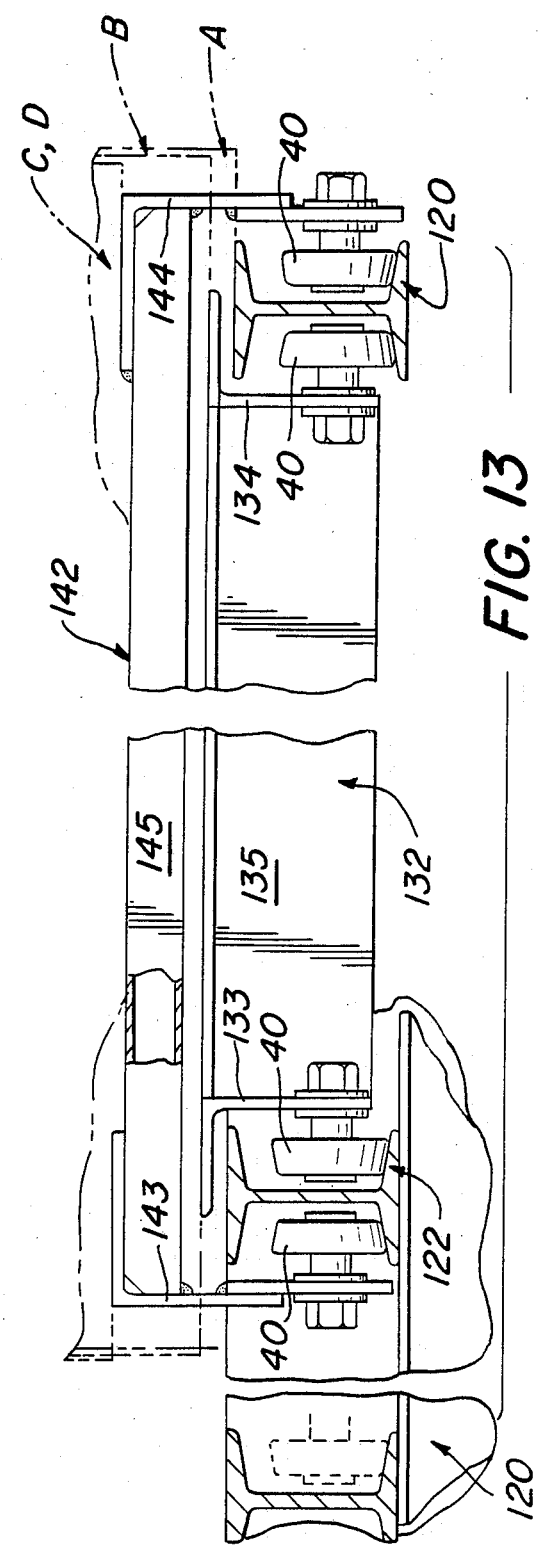

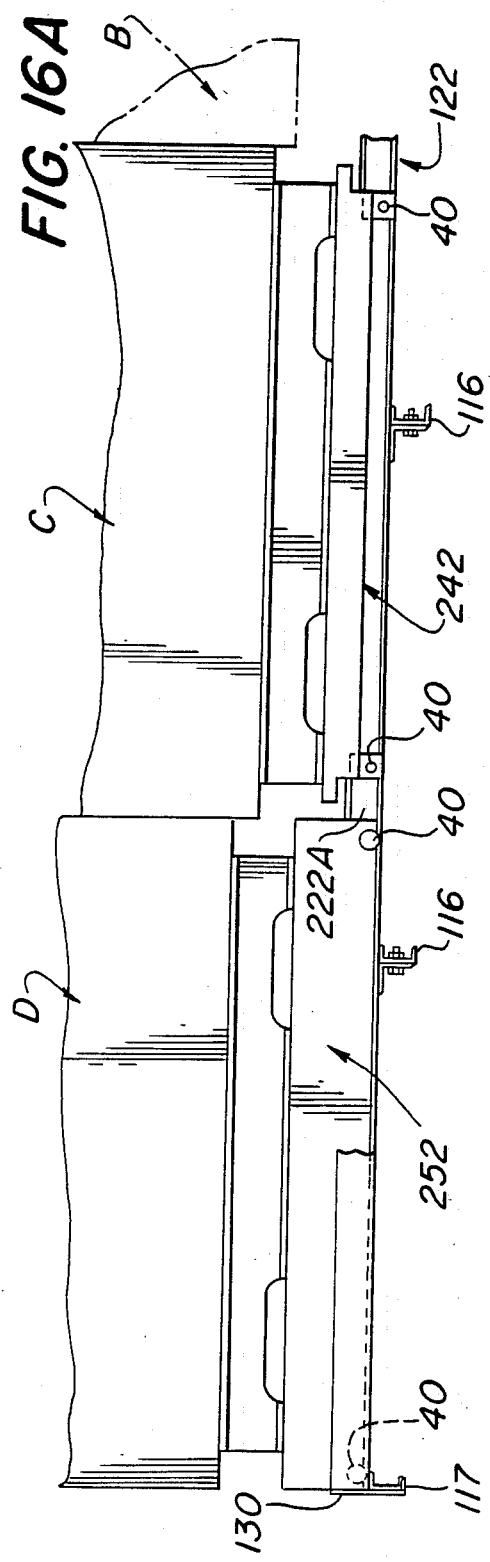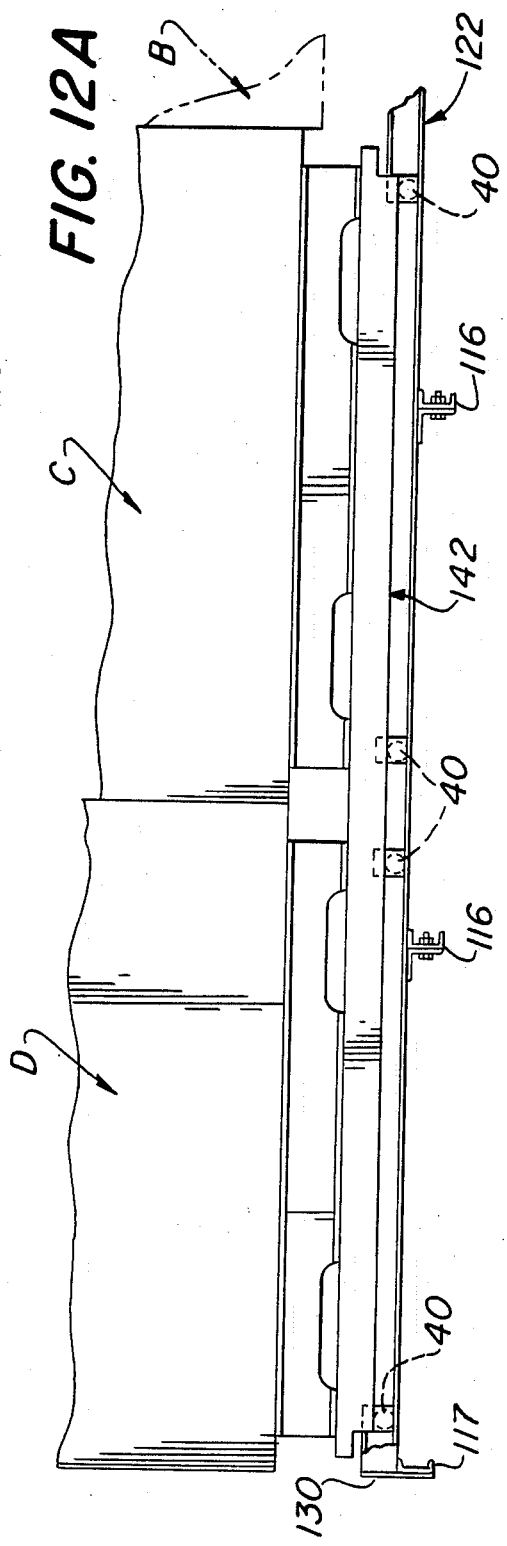

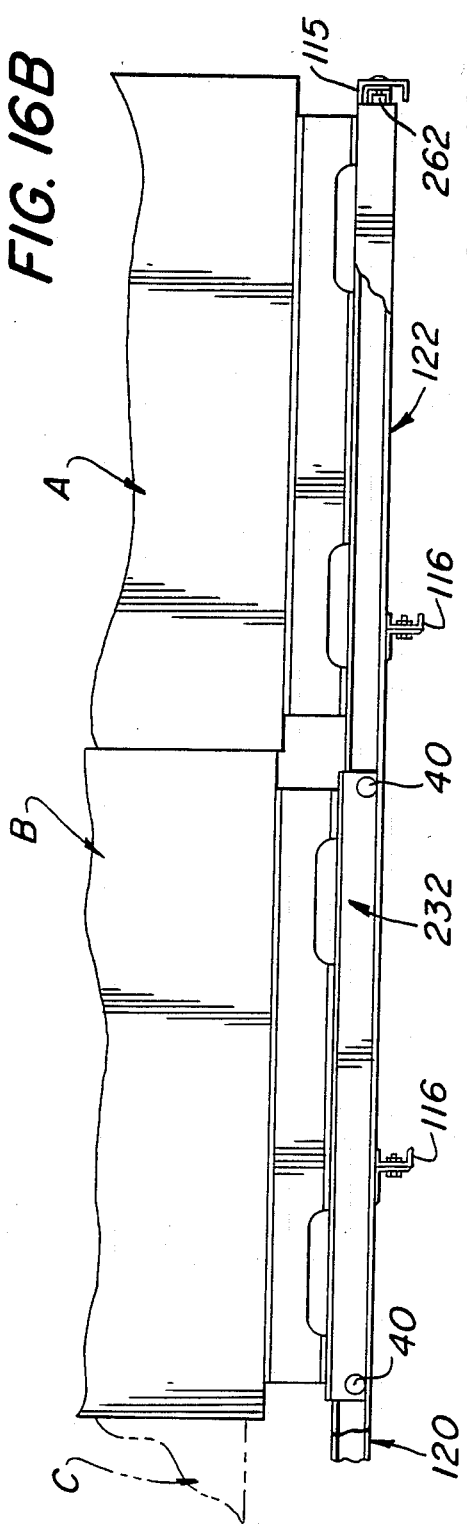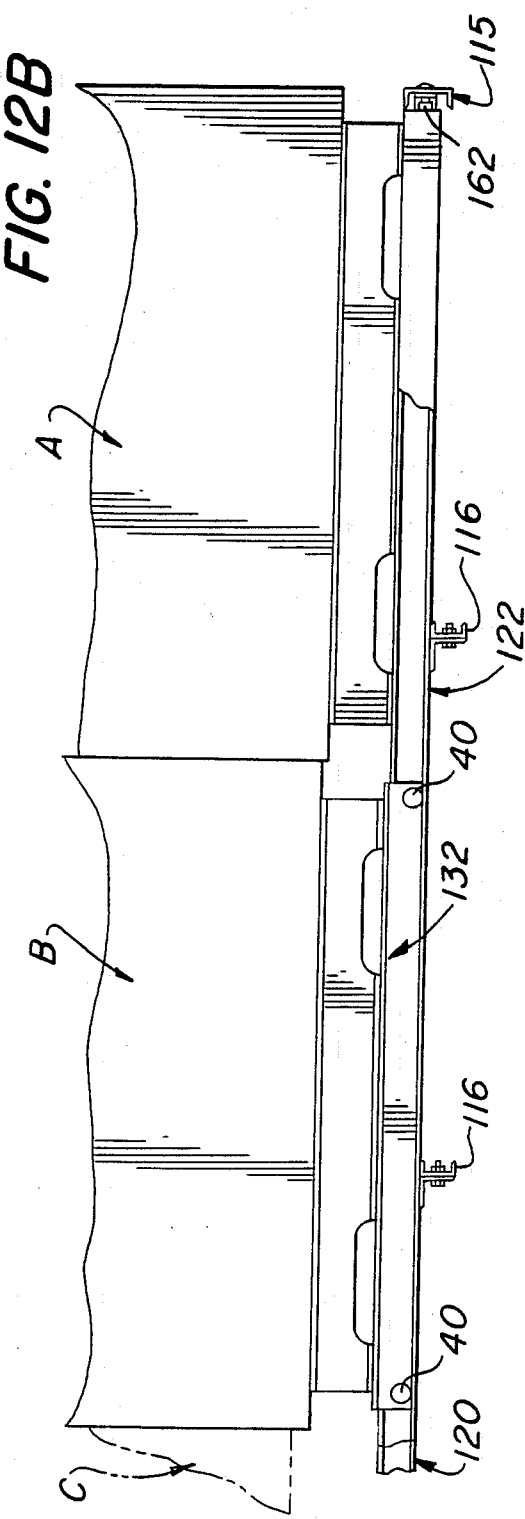

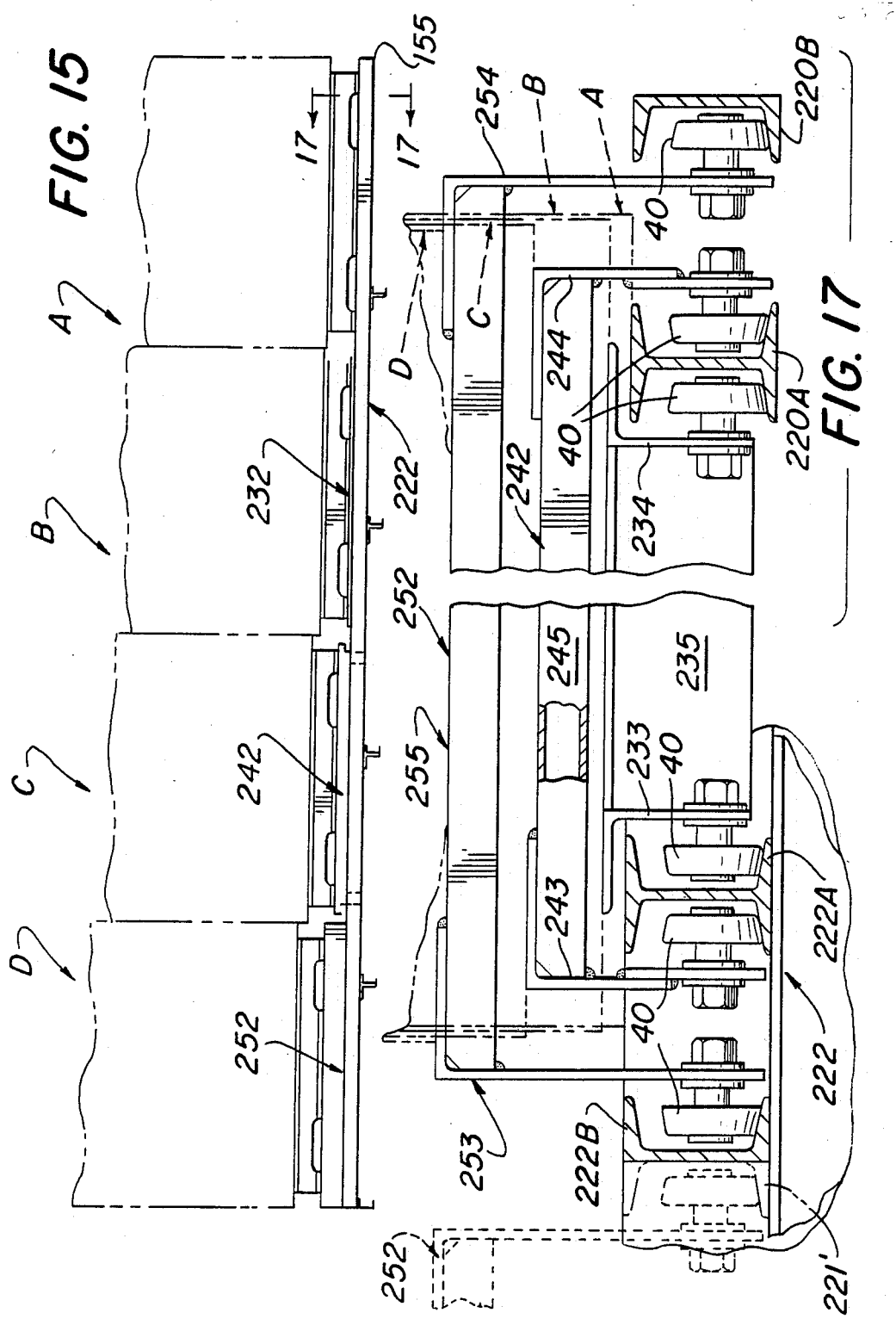

STORAGE RACK SYSTEM

BACKGROUND OF THE INVENTION

1. Field of the Invention

This invention relates generally to a storage rack system for articles loaded on pallets of the type adapted to be handled by lift trucks, and more particularly, to a storage rack system of the push-back type.

2. Description of the Prior Art

In about 1961 Frazier Industrial Company developed an order-picking system employing its "GLIDE-IN" racks, and described in its brochure entitled "The New Concept in Order-Picking Systems". This storage rack system eventually became known in the art as a push-back system. This system employs a cart, known as a "GLIDE-IN" cart, which has four bearing-type wheels adapted to ride on a track extending along the storage bay for a distance of two pallets deep, thereby providing double depth storage. The tracks are mounted on a slight incline to the horizontal so that the cart is always automatically in a forward position to receive a first load when the storage bay is empty. After the first pallet is placed on an empty cart by a fork truck, the cart remains in the forward position. When a fork truck with a second pallet load approaches the storage bay in the same elevation and is aligned with the first load, the fork truck with the second pallet load can be stored by gently nudging the first load rearwardly whereby the first load and the cart supporting the same is pushed back to the second depth position of the storage bay. The fork truck then leaves the second load on the track rails whereby the first load is automatically held in the back (two deep) position. This bay of the storage rack system is now fully loaded. To unload the storage bay with a fork truck, the reverse of the above-described procedure is performed. As soon as the forward pallet load is removed from the storage bay, the rear pallet load on the cart will roll forwardly to the forward position, known as the "pick" position.

The next system to be developed, in about 1982, was a cart system developed by the Highline Company. This cart system was a push-back system similar to the "GLIDE-IN" system described above. This system was sold under the tradename "HYPER-CART" and was adapted to store three pallets deep in a storage bay by the use of a lower cart and an upper cart. Each of the carts had three or four bearing type wheels on each side of the cart frame. Each cart road on a track comprised of a pair of right angle channels (known as structural angles) facing inwardly with separate tracks being provided for the lower cart and for the upper cart. The angles forming the track for the upper cart are positioned above the angles forming the track for the lower cart.

The next push-back system to be used in the art was a cart system sold by Speedrack, Inc. under its trademark "Speedcart". This system was adapted for storing three pallets deep and employed a lower cart and an upper cart provided with four flanged wheels, two wheels on each side of the cart frame. The track for the carts comprised a formed C-channel with the wheels of the upper cart riding on an outer portion of the horizontally extending web of the channel and the wheels of the lower cart riding on an inner portion of this horizontally extending web of the channel. U.S. Pat. Nos. 4,462,500 and 4,613,270 issued to Speedrack, Inc.

The next system to be developed in about 1984 was a cart system developed by INTERROLL Corporation and sold under its trademark "STACKRAIL". This was another type of push-back system for storing three pallets deep and utilized what was known in the art as a "flow track" which comprises a track formed by two inwardly facing C-channels supporting rollers spaced apart along the length of the track. Each storage bay was provided with a pair of spaced apart flow tracks each of which supported an inner carrier and an upper carrier comprised of a C-shaped formed channel with the flanges riding on the rollers and the pallets being supported by the web of the channels. This system provides a storage bay which was able to store three pallets deep and the track system was mounted at a slight incline to the horizontal so that the upper and lower pallet supports always tended to roll to the forward postiion of the storage bay.

The next system to be developed, in about 1985, was a system employing flow tracks similar to the INTERROLL system, the system being developed by the Interlake Company and sold under the tradename "PUSH BACK RAIL".

While the above-described three pallet deep systems were satisfactory, they were relatively expensive and there was a need for a less expensive storage rack system capable of handling three or more pallets deep in storage.

SUMMARY OF THE INVENTION

It is the general object of the invention to provide a storage rack system for storing multiple depths of pallets comprising a construction that involves a minimum cost in both manufacture and installation.

Another object of the invention is to provide a storage rack system of the indicated type which employs all structural components comprising commercially available hot rolled structural steel components and forms.

Briefly stated, the storage rack system in accordance with the invention is an extension of the "GLIDE-IN" system developed by Frazier Industrial Company. The system of the invention comprises an upper cart and a lower cart provided with bearing-type wheels. A track means is provided for guiding the lower cart throughout the depth of the storage area and another track means is provided for guiding the upper cart for movement throughout the depth of the storage bay area. In accordance with the invention, means are provided to ensure that the wheels on the carts ride properly on the tracks so that there is good rolling contact between the wheel rollers and the track portion on which they are supported. This good rolling contact is important in order to ensure that the carts will roll easily both rearwardly and forwardly in their loaded condition so that they can be maintained in the proper position for achieving the multiple depth storage push-back mode of operation.

DETAILED DESCRIPTION OF THE DRAWINGS

FIG. 3 is a sectional view taken on line 3—3 of FIG. 2.

FIG. 5 is a sectional view taken on line 5—5 of FIG. 2.

FIG. 6 is an enlarged detail view showing the encircled part of FIG. 2.

FIGS. 10, 11, 12A, 12B, 13 and 14 show a storage rack system for storing four pallets deep.

FIG. 15, 16A, 16B and 17 show another storage rack system for storing four pallets deep.

DETAILED DESCRIPTION OF THE PREFERRED EMBODIMENTS

Figure 1:
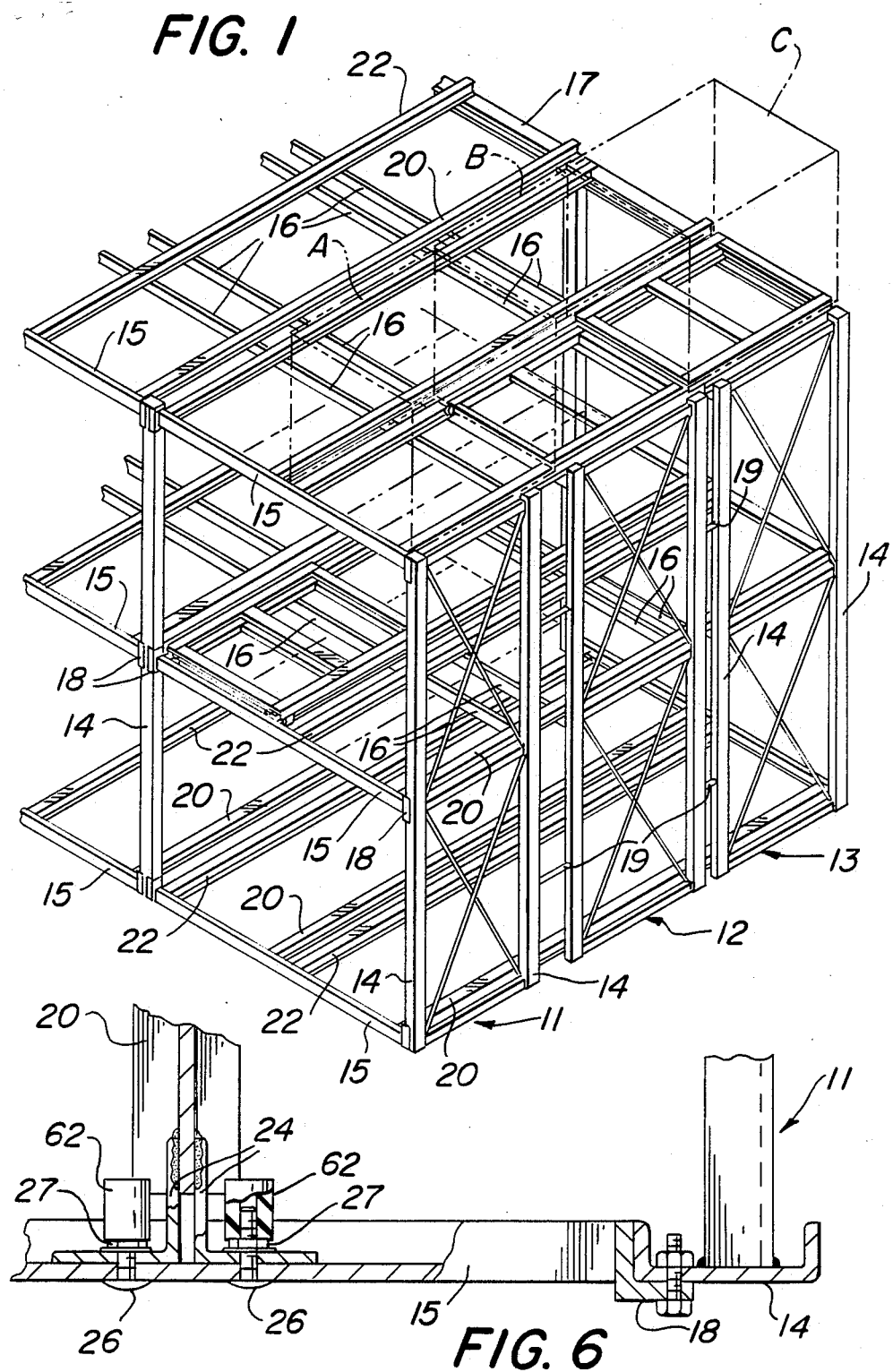
FIG. 1 is a perspective view showing part of a storage rack system employing the push-back rack construction in accordance with the invention for the storage of three pallets deep.

The storage rack system shown in FIG. 1 comprises a framework providing a plurality of storage bays each of which is defined by a plurality of vertical uprights and horizontal shelf beams constructed and arranged in a generally conventional arrangement, such as for example, the storage racks manufactured by Frazier Industrial Company. In FIG. 1, various parts of the framework and storage rack system have been omitted for the sake or clarity of illustration. FIG. 1 shows two storage bays in the lower corner of the storage rack system having their entry ends facing generally to the left of this FIG. Each of these storage bays is constructed of a depth to provide storage for three pallets deep and of a width to accommodate two rows of pallets. To this end, there are provided three vertically extending upright frames indicated at 11, 12 and 13 (only the three frames on the right side of the storage bays being shown completely in FIG. 1). Each of the upright frames 11, 12 and 13 is comprised of a pair of upright columns 14 joined by horizontally extending ties and crossbrace members. This frame structure is conventional in the art and is employed in the storage racks of Frazier Industrial Company. Each of the right side upright frames 11, 12 and 13 is connected with a corresponding upright frame 11', 12' and 13', respectively, on the left side of the storage bays by means of a plurality of horizontally extending shelf beams, including a front shelf beam 15, four interior shelf beams 16 and a rear shelf beam 17. Shelf beams 15, 16 and 17 are connected, by means of bolts and connectors, at their ends with aligned columns 14 of the upright frames 11, 12 and 13 and 11', 12' and 13'. This connection design is conventional, the connectors 18 for the front shelf beam 15 being shown in FIGS. 1, 3 and 6. This arrangement of the upright frames 11, 12 and 13 and 11', 12' and 13' and horizontal shelf beams 15-17 provides two important functions, namely, (1) to provide means for supporting the pallets containing the stored loads and (2) to support the track means and carts for positioning the pallet loads in the storage bays.

In accordance with conventional construction, each pair of adjacent upright frames 11, 12 and 13 are connected to each other by the use of a pair of back-to-back ties 19 shown in FIG. 1. The back-to-back ties 19 serve to keep the upright frames 11, 12 and 13 stabilized. It will be apparent that each storage bay is of a size to contain as many as six pallets, there being two rows of pallets three deep. In FIG. 1 there is shown in dashed lines the general position of a row of three pallet loads indicated at A, B and C.

Figure 2:
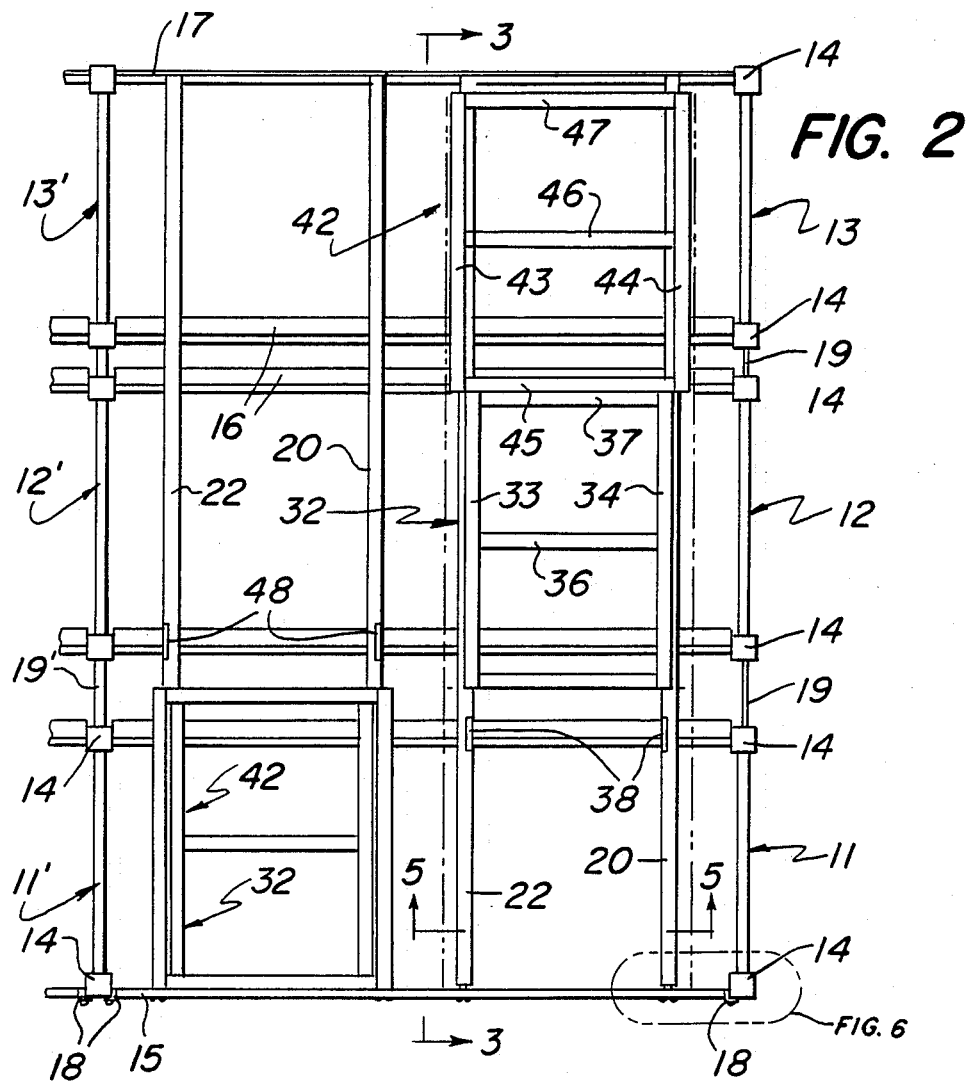
FIG. 2 is a plan view of part of the storage rack system shown in FIG. 1 with the pallet supporting carts in a typical pallet storing position.
Figure 4:
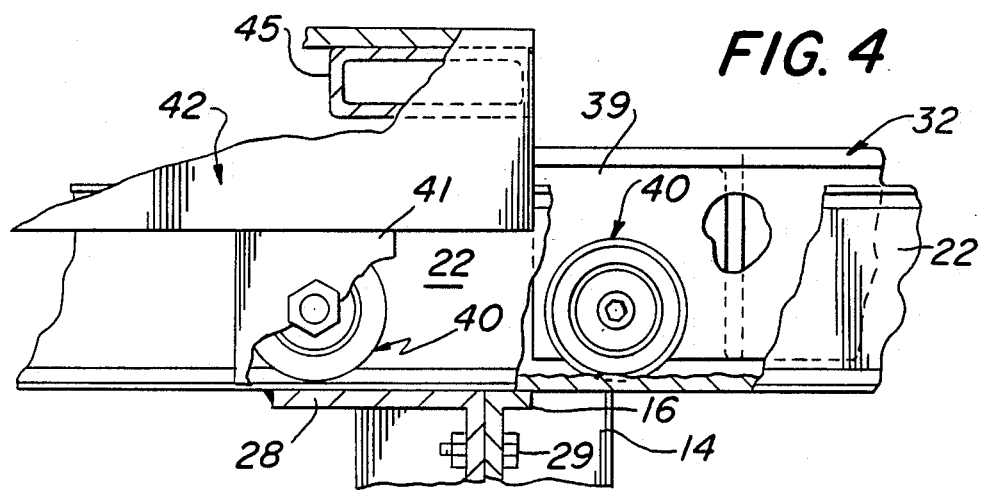
FIG. 4 is an enlarged detail view showing the encircled part of FIG. 3.
Figure 7:
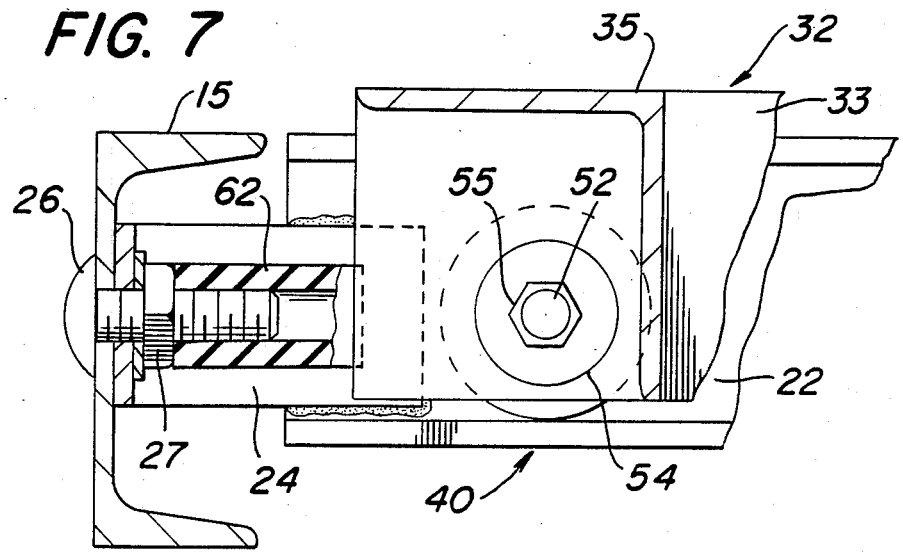
FIG. 7 is a detail view showing the bumper arrangement employed in the storage rack system in accordance with the invention.

For each row of stored pallets, there is provided a pair of associated track means 20 and 22 extending from the front to the back of the storage bay along the depth thereof Each pair of associated track means 20 and 22 is spaced apart across the width of the storage bay as is apparent from a consideration of FIGS. 1, 2 and 5. Each of the track means 20 and 22 is comprised of a structural channel member having an I-shaped cross-section. Each of the channel members of the track means 20 and 22 is supported on and secured to the shelf beams 15-17 in the arrangement shown in the drawings. More specifically, each of the channel members forming a track means 20 or 22 is bolted to a front shelf beam 15 in two locations, one on each side of the web of the I-shaped channel member by means of angle brackets 24. As shown in FIG. 7, each angle bracket 24 has one leg welded to the web of the I-shaped channel member and the other leg bolted to the front shelf 15 by a bolt means including a bolt 26 and a nut 27. Thus, for each storage bay there are four I-shaped channel members bolted to the front shelf 15 to provide two pairs of associated track means 20 and 22. As best shown in FIG. 3, the interior shelf beams 16 have the channel members forming the track means 20 and 22 supported thereon and secured thereto. To this end, each shelf beam 16 has an angle 28 welded to the bottom flange of a supported channel member and bolted, by bolts 29, to the shelf beam 16 on which the channel member is supported. For each interior shelf beam 15, four channel members forming the two pairs of associated track means 20 and 22 are secured and supported thereby in the manner described above. The rear shelf beam 17 is mounted so the channel members forming the track means 20 and 22 run over the top thereof and are secured thereto by the use of a plate 30 that runs behind the I-shaped channel member and the rear shelf beam 17. Plate 30 is welded to the I-shaped channel member and is fastened to the rear shelf beam 17 by the use of bolts 31. Each plate closes the rear end of a channel member forming the track means 20 and 22 to provide a rear stop for the wheels of the carts riding thereon as will be described hereafter.

Each pair of associated track means 20 and 22 is adapted to support a lower cart 32 and an upper cart 42 and to guide said carts for movement along the depth of the storage bay as will be described hereafter. Referring to FIG. 2, each lower cart 32 and upper cart 42 is movable on a pair of associated track means 20 and 22 between a forward position and a back position, the forward position of each upper and lower cart 32 and 42 being shown in the lefthand row of the storage bay shown in this FIG. and the back position thereof being shown in the righthand row of this storage bay.

Figure 8:
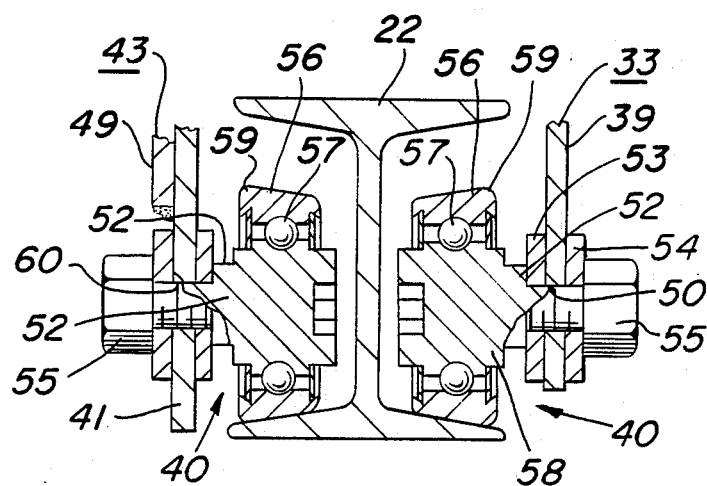
FIG. 8 is a detail view of the wheels employed on the carts used in the storage rack system in accordance with the invention.

The lower cart 32 is manufactured as an independent unit and includes a rectangular frame formed of five structural angles 33-37 welded together as shown in the Drawings. Thus, there are a pair of side angles 33 and 34, a front angle 35, a middle angle 36 and a rear angle 37. The side angles 33 and 34 which run the depth of the storage system are typically forty-six inches long. A pair of bearing-type wheel assemblies 40 are mounted on each side angle 33 and 34 to provide four rolling supports for the lower cart 32. The construction of each wheel assembly 40 will be described in detail hereafter and is shown in FIG. 8.

The lower cart 32 is mounted into a pair of associated track means 20 and 22 by way of a pair of aligned cutouts 38 in the upper flange of the I-shaped channels forming said track means 20 and 22. The cutouts 38 are shown in FIG. 2 as being located above an interior shelf beam 16 to provide for the strongest construction. The cutouts 38 are constructed and arranged to permit the insertion of the wheel assemblies 40 for the lower cart 32. In the installed position of the lower cart 32, the wheel assemblies 40 therefor ride on the tapered inwardly facing bottom flange portion of the channel members forming track means 20 and 22 as is shown in FIG. 5.

The upper cart 42 is an independent unit and includes a rectangular frame formed of five structural members 4347 welded together as shown in the Drawings. Thus, there are provided a pair of side structural angles 43 and 44, a front structural tube 45, a middle structural tube 46, and a rear structural tube 47 extending between the side angles 43 and 44. The side angles 43 and 44 which run the depth of the storage system are typically about forty-eight inches in length, whereby upper cart 42 is slightly longer than the lower cart 32. A pair of bearing-type wheel assemblies 40 are mounted on each side angle 43 and 44 to provide four rolling supports for the upper cart 42. The upper cart 42 is mounted into a pair of associated track means 20 and 22 through cutouts 48, shown in FIG. 2, by passing the wheel assemblies 40 of the upper cart therethrough. As best shown in FIG. 5, the upper cart wheel assemblies 40 ride on the tapered outwardly facing bottom flange portion of the I-shaped channel members forming the track means 20 and 22.

It will be apparent that the above-described construction provides an arrangement whereby the pair of the wheel assemblies 40 on one side of the lower cart 32 are guided in a first guide means on one of the track means 20 and the wheel assemblies 40 on the other side of the lower cart 32 are guided by a first guide means on the other associated track means 22 as the lower cart 32 moves along the depth of the storage bay between the forward lower cart position and the back lower cart position. In a like manner, a pair of wheel assemblies 40 on one side of the upper cart 42 are guided by a second guide means on said one track means 20 and a pair of wheel assemblies on the other side of the upper cart 42 are guided by a second guide means on the other associated track means 22 as the upper cart 42 moves along the depth of the storage bay between its forward and back position.

In accordance with a feature of the invention, the wheel assemblies are constructed and arranged on the carts 32 and 42 so as to ride on the tracks supporting the same so that there is good rolling contact between the wheel rollers and the track portion on which they are supported. This good rolling contact is important in order to ensure that the carts 32 and 42 will roll easily both rearwardly and forwardly in their loaded condition so that they can be maintained in the proper stored position for achieving the multiple depth storage push-back type of operation.

Referring to FIG. 8, each of the side angles 33 and 34 of the lower cart 32 has two horizontally extending holes 50 punched in the vertically extending leg 39 thereof, each hole 50 being used to mount a wheel assembly 40. Each of the wheel assemblies 40 has a horizontally extending axle 52 having a threaded reduced diameter portion extending on a horizontal axis through a hole 50 in vertically extending side leg 39 of a side angle 33 or 34. The reduced diameter portion of axle 52 extends through a pair of round washers 53 and 54 on opposite sides of the vertically extending leg 39 and is engaged at its threaded end with a nut 55 in an arrangement whereby axle 52 is secured in place to extend on a horizontal axis. A wheel rim 56 is rotatably supported on the hub 58 of the axle 52 by means of a roller bearing means 57 positioned between the hub 58 and the wheel rim 56 by conventional sealed roller bearing construction known in the art. A novel feature of the wheel assembly 40 is that the wheel rim 56 is formed with a tapered outer or rolling surface 59. The taper angle on the rolling surface 59 of the wheel rim 56 is the same as the taper angle formed on the bottom flange portion of the I-shaped channel member, as is apparent from a consideration of FIG. 8. This serves to provide good rolling contact between the wheel rims 56 of the wheel assemblies 40 of the carts 32 and 42 and the supporting surface (i.e., the tapered bottom flange portion) of the guide means provided by the track means 20 or 22. It is important to have this good rolling contact because of the heavy loads that are to be supported on the carts 32 and 42 and these loads are ultimately supported by the wheel assemblies 40 as the carts 32 and 42 ride on the bottom channel portion of the I-shaped channel members.

Figure 9:
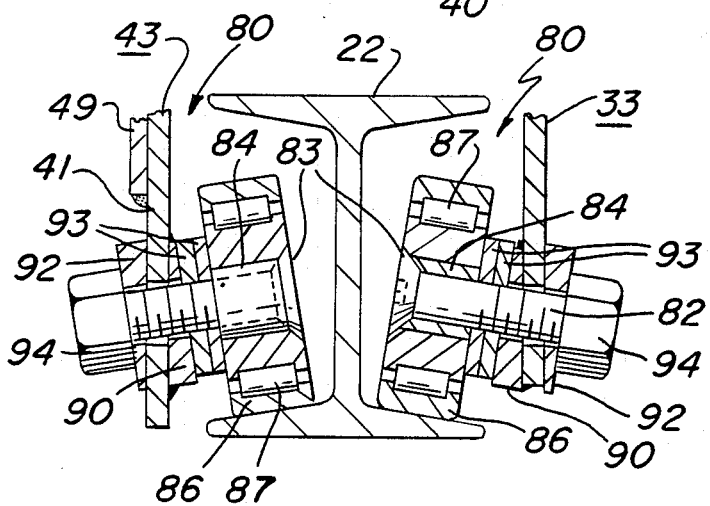
FIG. 9 is a detail view of an alternate arrangement for supporting the wheels on the carts used in the storage rack system in accordance with the invention.

The mounting of the wheel assemblies 40 on the upper cart side angles 43 and 44 is essentially identical to that of the mounting of the wheel assemblies 40 on the lower cart side angles 33 and 34, the major difference being that the wheel assemblies 40 on the upper cart 42 are mounted to face inwardly as is apparent from a consideration of FIG. 5 and 9. The mounting for the wheel assemblies 40 on the upper cart 42 includes a pair of tabs 41 welded to each of the side angles 43 and 44 to extend vertically downwardly from the vertical leg 49 thereof to a position adjacent the outwardly facing channel of the I-shaped channel members forming the track means 20 and 22. Each of the tabs 41 has a horizontally extending hole 60 punched therein to provide a mounting for the axle 52 of the wheel assembly 40 in the same manner as the horizontally extending hole 50 provided in the vertical leg 39 of the angles 33 and 34 of the lower cart 32. The wheel assemblies 40 for the upper cart 42 are thus mounted to extend on a horizontal axis and the tapered wheel rims 56 thereof are positioned to provide good rolling contact between the upper cart 42 and the supporting surface (i.e., the tapered bottom flange portion of the guide means provided by the channel members forming the track means 20 and 22.

In accordance with the invention there are provided bumper means for holding the lower carts 32 and the upper carts 42 in their forward positions at the entry end of each storage bay. To this end, there is provided a bumper 62 for contacting each of the forwardly positioned wheel assemblies 40 of the lower carts 32 and the upper carts 42. Since each of these bumpers 62 is identical in construction, only one will be described in detail, with particular reference to FIG. 7. As shown in this FIG., each bumper 62 comprises a rubber stop member in the form of a hollow cylinder which is mounted on the rearwardly projecting end of the bolt 26. The bumpers 62 are arranged to contact the forward wheel assemblies 40 of the carts 32 and 42 at a predetermined position at the forward end of the storage bay so as to position the carts 32 and 34 in their forward position approximately immediately adjacent to the front shelf 15 of the storage bay. The lower and upper carts 32 and 42 will normally roll along the inclined track means 20 and 22 forwardly until they contact the bumpers 62 at this forward position and will then be stopped in this position. As discussed above, each of the lower and upper carts 32 and 42 is associated with two bumpers 62 for contacting each of the forwardly mounted wheel assemblies 40 thereof.

As mentioned above, the track means 20 and 22 are mounted on the shelf beams 15-17 so that they extend with a slight inclination toward the entry end of a storage bay. The inclination is achieved by the accurate locating of the position of the supporting shelf beams 15-17 and, typically, is about ¼ inch for each twelve inches of length. It is noted that this inclination may not be apparent in the Drawings because of the small scale thereof.

As discussed above, the forward positions of the lower and upper carts 32 and 42 are located at the entry end of the storage bay, the back position of the lower cart 32 is located two pallets deep from the entry end of the storage bay and the back position of the upper cart 42 is located three pallets deep from the entry end of the storage bay. Thus, each row of the storage bay can store three pallet loads A, B and C in an arrangement as best shown in FIG. 3. Thus, the front pallet supporting load A is supported on the track means 20 and 22, the middle pallet supporting load B is supported on the lower cart 32 and the back pallet supporting load C is supported on the upper cart 42.

The pallet loads A, B and C will be placed in the positions shown in FIG. 3 by a conventional push-back loading technique employing conventional fork trucks as follows:

The fork truck carrying the pallet supporting the first load to be stored (load C) will approach the empty storage rack from the aisle and move through the entry end of the storage bay to place the first load onto the empty upper cart 42, which has assumed its position on the entry end of the storage bay as described above. The lower and upper carts 32 and 42 will always be positioned in their forward position when empty by reason of the mounting of the track means 20 and 22 with a slight inclination towards the entry end of the storage bay. When it is desired to store the second stored pallet load (load B) in the storage bay, the fork truck approaches the storage rack at an elevation such that fork truck and the second pallet load B gently nudge the first load C toward the rear whereby by first load C, and the upper pallet 42 supporting the same, will be pushed back rearwardly toward the rear of the storage rack up to the point where the fork truck can place the second load B on the empty lower cart 32. When it is desired to store a third pallet load (load A), the fork truck with the third pallet load A approaches the storage rack in the same elevation as with the previous load and the fork truck with the third pallet load A thereon gently nudges the first and second pallet loads B and C supported on the upper and lower carts 42 and 32, respectively, toward the rear of the storage rack until the fork truck can leave the third pallet load A on the track means 20 and 22 and the front shelf beam 15 in the front loading position at the entry end of the storage bay. In this manner, the row of the storage rack is fully loaded with three pallet loads. In order to unload the three pallet loads, a procedure which is essentially the reverse of the above-described procedure is employed. As soon as the forward pallet load A is removed, the pallet loads B and C on the lower cart 32 and the upper cart 42 will roll forwardly to position the lower cart 32 at the front (pick) position. In a like manner, when the pallet load B on the lower cart 32, which is now in the pick position, is unloaded, this will allow the pallet load C on the upper cart 42 to roll forwardly to the front or pick position where it can be subsequently unloaded by a fork truck as desired.

In FIG. 9 there is shown an alternate type of wheel assembly which is particularly adapted for use with very heavy loads. The wheel assembly 80 shown in FIG. 9 comprises a bolt 82 which defines an axle of the wheel assembly 80. The head 83 of bolt 82 has a flat conical Allen-head construction and extends through a hub 84 on which is rotatably mounted a cylindrical wheel rim 86 which is supported on the hub by roller bearings 87 in a conventional manner. The wheel assemblies 80 are mounted on the carts 32 and 42 at the vertically extending legs 39 of angle member 33 and 34 for the lower cart 32 and at the vertically extending tabs 41 for the upper cart 42 at the holes 50 and 60, respectively, provided therein. The mounting means also includes a pair of square-shaped tapered collars 90 and 92 located on opposite sides of the vertically extending supporting parts of the carts 32 and 42. The inside collar 90 is welded to the cart leg in a fixed position as shown in FIG. 9 while outside collar 92 is loosely fitted on bolt 82. The entire wheel assembly 80, including the tapered collars 90 and 92 and a pair of round washers 93 positioned between the inner collar 90 and the hub 84 is secured in position by means of the tightening of a nut 94 which is engaged with the threaded outer end of the bolt 82. This mounting construction and arrangement is such that the axle bolt 82 of the wheel assembly 80 will extend at an angle to the horizontal, which angle corresponds to the taper angle of the flanges of the I-shaped channel members on which the wheel rim 86 will roll. Accordingly, there is provided good rolling contact between the wheel rim 86 of the wheel assemblies 80 and the guide means provided by the I-shaped channel members forming track means 20 and 22.

Figure 10:
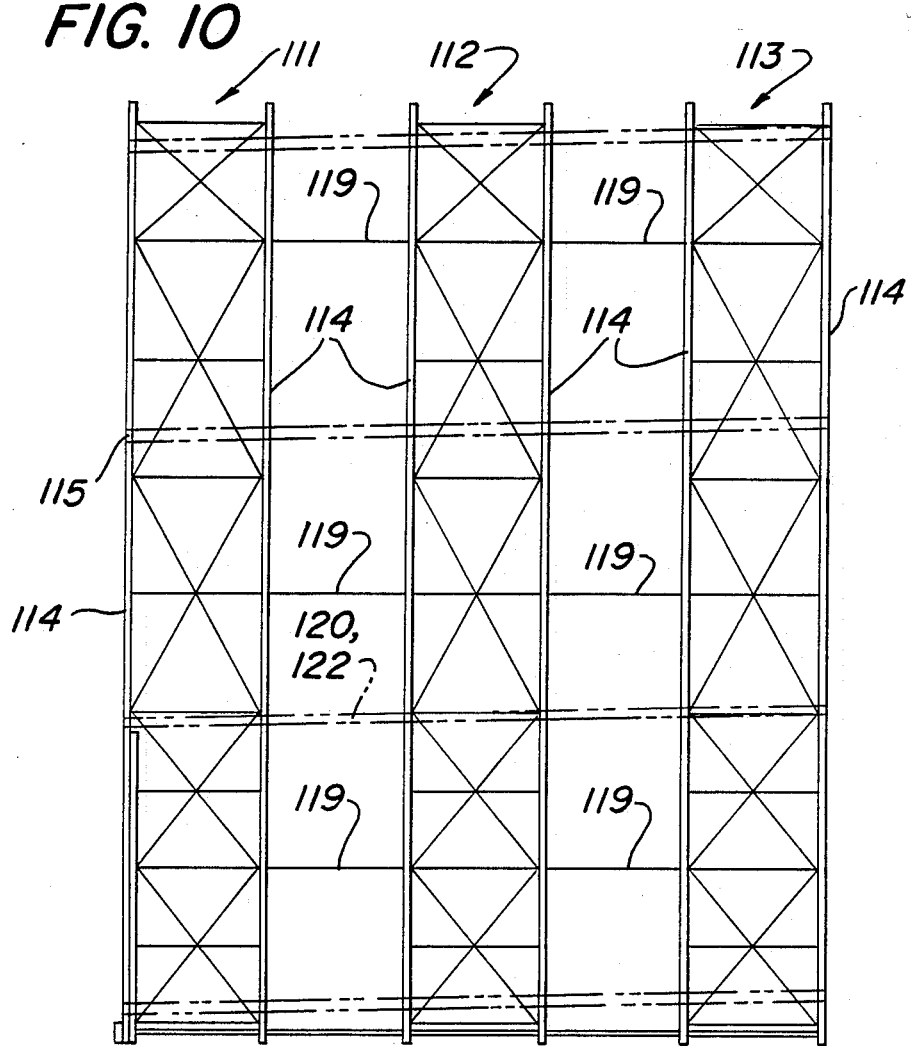
Figure 14:
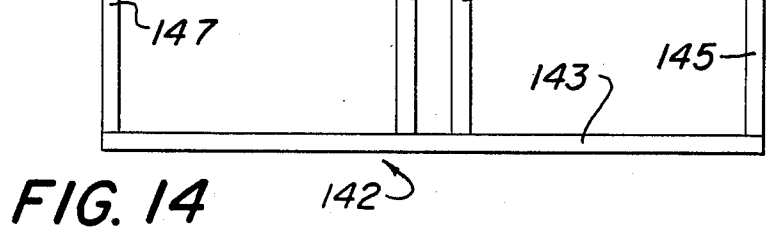

In FIGS. 10-14 there is shown a storage rack system for storing four pallets deep in each row. The storage rack system shown in FIGS. 10-14 comprises a framework which is essentially the same as that shown in FIG. 1, the main differences being that the spaces between adjacent upright frames are widened and the track means are lenghtened to store four pallets deep in each row. Thus, the framework provides a plurality of storage bays each of which is defined by a plurality of vertical uprights and horizontal shelf beams constructed and arranged in a generally conventional arrangement such as the storage racks manufactured by Frazier Industrial Company. Each of these storage bays is constructed of a depth to provide storage for four pallets deep and of a width to accommodate two rows of pallets. There are provided three vertically extending upright frames indicated at 111, 112 and 113 essentially identical to the corresponding upright frames 11, 12 and 13 shown in FIG. 1. Each of the upright frames 111, 112 and 113 is comprised of a pair of upright columns 114 joined by horizontally extending ties and crossbrace members. Each of the upright frames 111, 112 and 113 shown in FIG. 10 is located on the right side of the storage bay and is connected with a corresponding upright frame on the left side of the storage bay by means of a plurality of horizontally extending shelf beams, including, as shown in FIGS. 12A and 12B, a front shelf beam 115, four interior shelf beams 116 and a rear shelf beam 117.

Shelf beams 115, 116 and 117 are connected, by means of bolts and connectors, at their ends with aligned columns 114 of the right side and left side upright frames 111, 112 and 113 in the same manner as described above with respect to the storage rack system shown in FIG. 1. Also, as discussed above with respect to FIG. 1, each pair of adjacent upright frames 111, 112 and 113 are connected to each other by the use of a pair of back-to-back ties 119 which serve to stabilize said frames. It will be apparent that each storage bay is of a size to contain as many as eight pallets, there being two rows of pallets four deep. In FIG. 11 there is shown the general position of a row of four pallet loads, indicated at A, B, C, and D.

For each row of stored pallets, there is provided a pair of associated track means 120 and 122 extending from the front to the back of the storage bay along the depth thereof. Each pair of associated track means 120 and 122 is spaced apart across the width of the storage bay in the manner described above with respect to the embodiment shown in FIG. 1. As best shown in FIG. 13, each of the track means 120 and 122 is comprised of a structural member having an I-shaped cross-section and is supported and secured to the shelf beams 115 and 117 in the same manner as the FIG. 1 embodiment. Each of the I-shaped members forming a track means 120 or 122 is bolted to a front shelf 115 at two locations as described above with respect to the FIG. 1 embodiment. Also, the rear shelf beam 117 is mounted so that the I-shaped members forming the track means 120 and 122 run over the top thereof and are secured thereto by the use of a plate 130 that runs behind the associated I-shaped member and rear shelf beam 117 so as to provide a rear stop for the wheels of the carts riding thereon in the manner described above with respect to FIG. 1.

Each pair of associated track means 120 and 122 is adapted to support a lower cart 132 and an upper cart 142 and to guide said carts for movement along the depth of the storage bay in essentially the same manner as described above with respect to the embodiment shown in FIG. 1. Thus, each lower cart 132 and upper cart 142 is movable on a pair of associated track means 120 and 122 between a forward position and a back position, the forward position being located at the entrance end of the storage bay and the back position being shown in FIG. 11 wherein the carts are in the position for the storage of four pallets deep in a row of the storage bay. FIGS. 12A and 12B are an enlarged showing like FIG. 11 and show the carts in their back position.

The lower cart 132 is essentially identical to the lower cart 32 described above in the embodiment shown in FIG. 1 and includes a rectangular frame formed of five structural angles welded together. There are provided a pair of side angles 133 and 134, a front angle 135, a middle angle and a rear angle. A pair of bearing-type wheel assemblies 40 are mounted on each side angle 133 and 134 to provide four rolling supports for the lower cart 132. The construction of the wheel assemblies 40 has been described in detail above and is shown in FIG. 8.

The lower cart 132 is mounted into a pair of associated track means 120 and 122 by way of a pair of aligned cutouts as was described above with respect to the embodiment shown in FIG. 1. In the installed position of the lower cart 132, the wheel assemblies 40 therefor ride on the tapered inwardly facing bottom flange portion of the I-shaped channel members forming track means 120 and 122 as is shown in FIG. 13.

The upper cart 142 is similar to the upper cart 42 of the FIG. 1 embodiment except that it is about twice as long, it includes a pair of middle structural tubes and is provided with two extra pairs of wheel assemblies 40 in the middle thereof as will be described hereafter. Thus, the upper cart 142 includes a rectangular frame formed of six structural members welded together as shown in the arrangement shown in FIG. 14. There are provided a pair of side structural angles 143 and 144, a front structural tube 145, a pair of middle structural tubes 146, and a rear structural tube 147 extending between the side angles 143 and 144. The side angles 143 and 144 run the depth of the storage system, are typically about 108 inches in length, and are adapted to support two pallet loads C and D thereon in an arrangement as best shown in FIG. 12A. Four of the bearing type wheel assemblies 40 are mounted on each side angle 143 and 144 to provide eight rolling supports for the upper cart 142. As is best shown in FIG. 12, the upper cart wheel assemblies 40 ride on the tapered outwardly facing bottom flange portion of the I-shaped channel members forming the track means 120 and 122.

It will be apparent that the above-described construction provides an arrangement whereby the pair of wheel assemblies 40 on one side of the lower cart 132 are guided in a first guide means on one of the track means 120 and the pair of wheel assemblies 40 on the other side of the lower cart 132 are guided by a guide means on the other associated track means 122 as the lower cart 132 moves along the depth of the storage bay between the forward lower cart position and the back lower cart position. In a like manner, the eight wheel assemblies 40 on one side of the upper cart 142 are guided by a second guide means on said one track means 120 and the eight wheel assemblies on the other side of the upper cart 142 are guided by a second guide means on the other associated track means 122 as the upper cart 142 moves along the depth of the storage bay between its forward and back position.

It will be apparent that by utilizing the wheel assemblies 40 as described above, the carts 132 and 142 are constructed and arranged to ride on the track means supporting the same so that there is good contact between the wheel rollers and the track portion on which they are supported. This has been described in detail above with respect to the embodiment shown in FIG. 1.

The embodiment of the invention shown in FIGS. 10–14 is provided with bumper means which are identical to that employed in -he embodiment shown in FIG. 1, and which are arranged for holding the lower carts 132 and the upper carts 142 in their forward position at the entry end of each storage bay. To this end, there is provided a bumper 162 (FIG. 12B) for contacting each of the forwardly positioned wheel assemblies 40 of the lower carts 132 and the upper carts 142. The bumper 162 is identical to the bumper 62 as described above.

As in the case of the embodiment shown in FIG. 1, the track means 120 and 122 are mounted on the shelf beams 115–117 so that they extend with a slight inclination toward the entry end of a storage bay. As discussed above, this inclination is achieved by the accurate locating of the position of the supporting shelf beams 115–117, and is about ¼ inch per foot in length.

As discussed above, the forward positions of the lower carts 132 and 142 are located at the entry end of a storage bay, the back position of the lower cart 132 is located two pallets deep from the entry end of the storage bay (FIG. 12B) and the back position of the upper cart 142 is located to extend across the area covered by three and four pallets deep from the entry end of the storage bay (FIG. 12A). Thus, each row of the storage bay can store four pallet loads A, B, C, and D in the arrangement as shown in FIGS. 11 and 12A and 12B. The front pallet supporting load A is supported on track means 20 and 22, the forward middle pallet supporting load B is supported on the lower cart 132, the back middle pallet supporting load C is supported on the forward portion of cart 142, and the back pallet supporting load D is supported on the back portion of pallet 142.

The pallet loads A, B, C and D are placed in the position shown in FIG. 11 by a push-back loading technique employing fork trucks of a type well known in the art. This technique is essentially the same as described above with respect to the embodiment shown in FIG. 1. Thus, the first load to be stored (pallet load D) is placed onto an empty upper cart 142 at the back portion thereof so as to provide room for placing the second pallet load C in the forward portion thereof. When it is desired to store the second pallet load C in the storage bay, the fork truck places this pallet load in the forward portion on upper cart 142. From this point on, the loading procedure is identical to that described above with respect to the embodiment shown in FIG. 1. Thus, when the third pallet load B is to be stored, the fork truck approaches the storage rack and the pallet load B gently nudges the first two loads C and D toward the rear whereby the loads C and D (and the upper pallet 142 supporting the same) are pushed back rearwardly toward the rear of the storage rack up to the point where the fork truck can place the load B on the empty lower track 132. Also, when the fourth pallet load A is to be stored, the fork truck with the pallet load A thereon gently nudges the second pallet loads B, C and D supported on the upper and lower carts 142 and 132 toward the rear of the storage rack until the fork truck can leave the fourth pallet load A on the track means 120 and 122 and the front shelf beam 15 in the front loading position at the entry end of the storage bay. In this manner, the row of the storage rack is fully loaded with four pallet loads. In order to upload the four pallet loads, a procedure which is essentially the reverse of the above-described procedure is employed.

In FIGS. 15–17 there is shown another embodiment of the invention for storing four pallets deep in a row. This embodiment of the invention comprises a framework such as that shown in FIG. 10 providing storage bays constructed of a depth for four pallets deep and to accommodate two rows of pallets. Thus, the framework and the track means are of a dimension to accommodate two rows of four pallets deep as discussed above.

The storage rack system of this embodiment comprises a track means 220 and 222 which includes an I-shaped channel member 220A and 222A, respectively, for guiding a lower cart 232 and a cart 242 in an arrangement essentially identical to that shown in the FIG. 1 embodiment wherein the carts 32 and 42 are guided on a similar channel member. This is apparent from a consideration of FIGS. 5 and 17.

The novel feature of the embodiment shown in FIGS. 15–17 is that there is provided a third cart 252, which is guided for movement on a pair of U-shaped channel members 220B and 222B which form part of the track means 220 and 222. Cart 252 is constructed and arranged to ride above the cart 242 as is apparent from a consideration of FIG. 17.

For each row of stored pallets, there is provided a pair of associated track means 220 and 222 extending from the front to the back of the storage bay along the depth thereof. Each pair of associated track means 220 and 222 is spaced apart across the width of the storage bay as is shown in FIG. 17 and each is comprised, respectively, of a structural channel member 220A and 223A having an I-shaped cross section and a structural channel member 220B and 222B having a U-shaped cross section. Each of the channel members of the track means 220 and 222 is supported on and secured to shelf beams 215–217 in the arrangement similar to that described above. The spacing of these shelf beams 215–217 is shown in FIGS. 15 and 16A and 16B.

Each pair of associated track means 220 and 222 is adapted to support the carts 232, 242 and 252 to guide said carts for movement along the depth of the storage bay. Each cart 232, 242 and 252 is movable on a pair of associated track means 220 and 222 between the forward position and a back position, the forward position being located at the entry end of the storage bay and the back position thereof being shown in FIG. 14 and in FIGS. 16A and 16B.

The lower cart 232 is essentially the same as cart 32 and is formed of five structural angles welded together as shown in the Drawings and described above. The side angles 233 and 234 are typically 51 inches long and the width of the cart is typically 36 inches. A pair of bearing-type wheel assemblies 40 are mounted on each side angle 233 and 234 to provide four rolling supports for the lower cart 232. The lower cart 232 is mounted into a pair of associated track means 20 and 22 by way of aligned cutouts in the upper flange of the I-shaped channels forming said track means. In the installed position of the lower cart 232, the wheel assemblies 40 therefor ride on the tapered inwardly facing bottom flange portion of the I-shaped channel members 220A and 222A forming part of the track means 220 and 222 as is shown in FIG. 17.

The cart 242 includes a rectangular frame formed of five structural members, including two side angles and three structural tubes, welded together as shown in the Drawings and is essentially the same as cart 42 described above. The side angles 243 and 244 are typically about 41 inches in length and the width of the cart is typically 39 inches. A pair of bearing-type wheel assemblies 40 are mounted on each side angle 243 and 244 to provide four rolling supports for the cart 242. Cart 242 is mounted into a pair of associated track means 220 and 222 through cutouts in the I-shaped channel members as described above in an arrangement such that the wheel assemblies 40 of cart 242 ride on the tapered outwardly facing bottom flange portions of the I-shaped channel members 220A and 222A forming part of the track means 220 and 222.

The upper cart 252 is constructed in the manner essentially the same as cart 242 except that it is about four inches wider so as to ride over the top thereof as is apparent from a consideration of FIG. 16. Cart 252 is about three inches longer than cart 242. Thus, upper cart 252 includes five structural members welded together as shown in the Drawings. There are provided a pair of side structural angles 253 and 254, and a front structural tube 255, a middle structural tube and a rear structural tube extending between side angles 253 and 254. A pair of bearing-type wheel assemblies 40 are mounted on each side angle 253 and 254 to provide four rolling supports for the upper cart. The upper cart is mounted into a pair of associated track means 220 and 222 so as to ride on the tapered inwardly facing bottom flange portion of the U-shaped channel members 220B and 222B of the track means 220 and 222 as is best shown in FIG. 17.

There are provided bumper means for holding the carts 232, 242 and 252 in their forward positions at the entry end of the storage bay. Only one of the bumpers 262 is shown in FIG. 16B. It will be apparent that the bumpers 262 are arranged to contact the forwardly positioned wheel assemblies 40 of the carts 232, 242 and 252 to be held in the forward position.

As mentioned above, the track means 220 and 222 are mounted on the shelf beams 215–217 so that they extend with a slight inclination toward the forward end of the storage bay.

The forward positions of the carts 232, 242 and 252 are located at the entry end of the storage bay, the back position of the cart 232 is located two pallets deep from the entry end of the storage bay, the back position of the cart 242 is located three pallets deep from the entry end of the storage bay and the back position of the cart 252 is located four pallets deep from the entry end of the storage bay, as is apparent from a consideration of FIG. 15 and the enlarged showings of FIGS. 16A and 16B. Thus, each row of the storage bay can store four pallet loads A, B, C and D in an arrangement as shown in the drawings. Thus, the front pallet load A is located on the track means 220 and 222, the forward medial pallet load B is supported on the lower cart 232, the back medial pallet load C is supported on the cart 242, and the back pallet load D is supported on the cart 252.

The pallet loads A, B, C and D will be placed in the position shown in FIG. 15 by conventional push-back loading technique as is described above and employing conventional fork trucks. Thus, the fork truck carrying the first pallet load to be stored (load D) places the first load on the empty cart 252, which has assumed its position on the entry end of the storage bay as described above. When it is desired to store the second stored pallet load C in the storage bay, the fork truck moves the second pallet load C to gently nudge the first load D toward the rear whereby the first load D and the cart 252 supporting the same will be pushed back rearwardly toward the rear of the storage rack up to the point where the fork truck can place the second load C on the empty cart 242. When it is desired to store the third load B, the fork truck moves the supported load B to gently nudge the first and second pallet loads C and D supported on carts 242 and 252, respectively, toward the rear of the storage rack until the fork truck can leave the third pallet load B on the cart 232. When it is desired to store a fourth pallet load (load A), the fork truck with such pallet load A approaches the storage rack in the same elevation as with the previous loads and the fork truck with the fourth pallet load A thereon gently nudges the first, second and third pallet loads B, C and D supported on the carts 252, 242 and 232, respectively, toward the rear of the storage rack until the fork truck can leave the fourth pallet load A on the track means 220 and 222 in the front loading position at the entry end of the storage bay. In this manner, the row of the storage rack is fully loaded with four loads. In order to unload the four pallet loads, a procedure which is essentially the reverse of the above-described procedure is employed. As soon as the forward pallet load A is removed, the pallet loads B, C and D on the carts 232, 242 and 252 will roll forwardly to position the cart 232 in the front (pick) position. In a like manner, when the pallet load on cart 232 is in the pick position and is unloaded, this will allow the pallet loads C and D on carts 242 and 252 to roll forwardly to place load C in the front (or pick) position where it can be subsequently unloaded in the manner described above. In a like manner, when the pallet load C on the cart 232 is unloaded, this will allow the pallet load D on the cart 252 to roll forwardly to the front (or pick) position where it can be subsequently unloaded by a fork truck as desired.

In FIG. 17 there is a dashed showing of an alternate construction for the track means for a four deep system of the type shown in FIGS. 15–17 wherein three carts are used. In this construction, one of the channel members 222B of the track means for the upper cart 252 is made of an I-shaped channel member, as is shown by the dashed showing in FIG. 17 wherein this channel member is indicated as 221'. By the use of this construction, the two channels of the I-shaped channel member 221' are arranged to receive and guide the wheel assemblies 40 of both the upper cart 252 of the pallet row shown in FIG. 17 and to receive and guide the wheel assemblies 40 of the upper cart 252' of the carts serving the adjacent storage row, i.e., to the left of the carts shown in FIG. 17. In other words, the I-shaped channel member 221' serves as part of the two adjacent track means for the carts serving the two rows of pallets in each storage bay. In effect, the I-shaped channel member 221' takes the place of two U-shaped channel members 220B and 222B.

Figure 18:
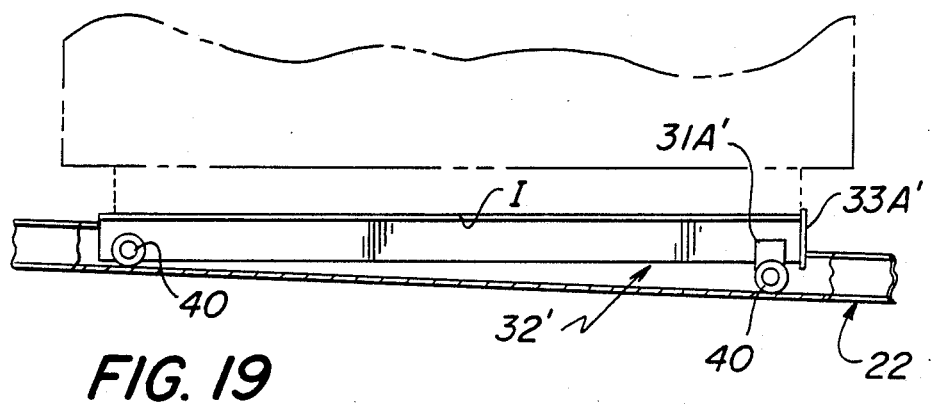
FIGS. 18-20 show an alternate form of cart construction.
Figure 19:
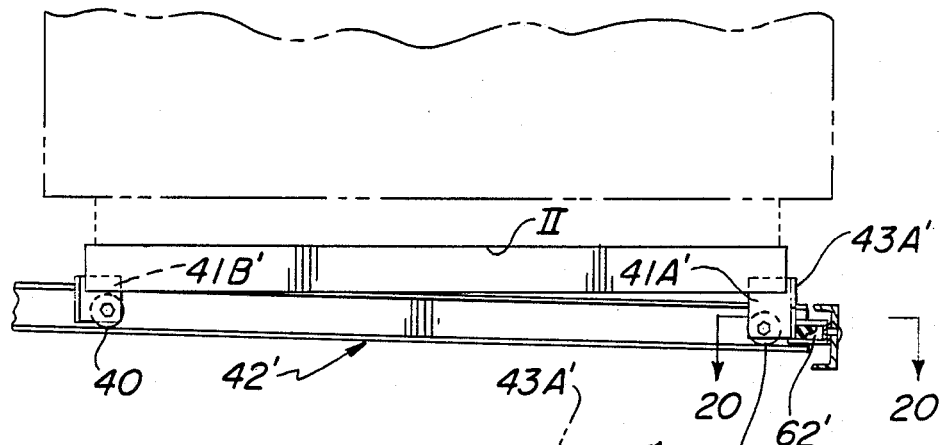
Figure 20:
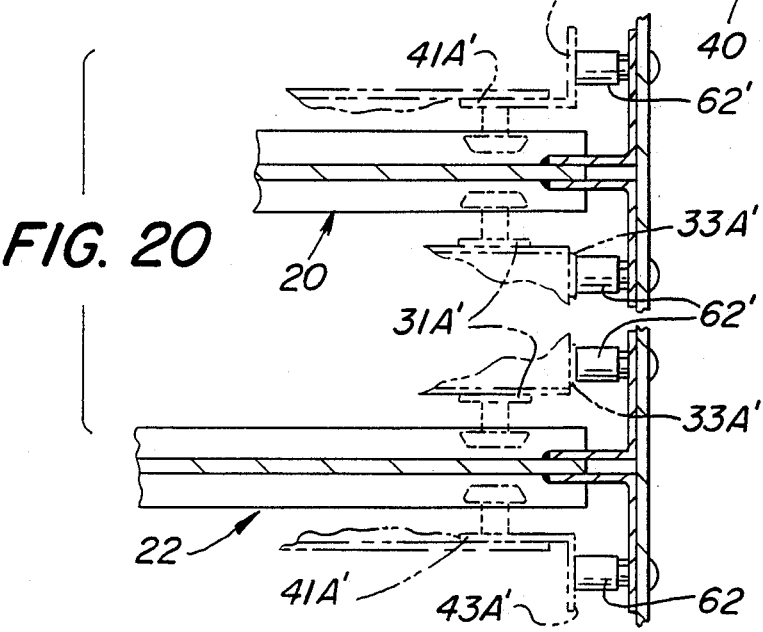

In FIGS. 18–20 there is shown an alternate form of cart construction wherein the pallet supporting the top surface of each cart is maintained in a level (i.e., horizontal) position on the inclined track means for said cart. This design addresses an important application in the materials handling industry wherein some fork trucks, or other vehicles, that serve a storage rack system cannot tilt their forks at an angle up or down from the horizontal. The cart design of the invention shown in FIGS. 18–20 serves to accommodate this type of fork truck by maintaining the pallet supporting top surface of the cart in a level position so that the pallets can be placed onto and taken from the carts at the pick position by the above-indicated type of fork truck. By the construction in accordance with the invention, both the lower cart and the upper cart move into the pick position with a pallet load on a horizontal plane and level with the floor. Accordingly, the fork trucks can service these carts without having to tilt their forks either up or down when retreiving a pallet off the cart. This design is particularly useful in very high storage systems working with specialized pieces of equipment such as the "RAYMOND" Model 90, which device uses a shuttle type of fork system that has no adjustability.

In FIG. 18 there is shown a lower cart 32' which is very similar to the lower cart 32 described above wherefore corresponding parts have been given the same reference numerals with primes added. The lower cart 32' is formed of five structural angles welded together, including a pair of side angles, a front angle, a middle angle and a rear angle. The horizontal legs of the five structural angles forming cart 32' are aligned in the same plane to provide a flat top support surface I for a loaded pallet positioned thereon. A pair of bearing-type wheel assemblies 40 are mounted on each side angle of cart 32' to provide four rolling supports therefor. The lower cart 32' is adapted to be mounted into a pair of associated track means 20 and 22 in the same manner as lower cart 32 as described above. Thus, the lower cart wheel assemblies 40 ride on the tapered inwardly facing bottom flange portions of the I-shaped channel members forming track means 20 and 22 in the same manner as described above with respect to cart 32.

In accordance with this alternate cart design, the support means for the lower cart wheel assemblies 40 are constructed and arranged so that the front end of the top support surface I of cart 32' is spaced from the place of rolling contact with the track means 20 and 22 an amount greater than that of the back end of the top support surface I such that said top support surface is maintained in a horizontal plane while the cart 32' is supported on the inclined track means 20 and 22. To this end, each of the pair of wheel assemblies 40 at the front end of cart 32' are mounted on the side angles thereof by a plate 31A' which is welded to the vertical legs of the side angles of the cart 32' in an arrangement to support the front wheel assemblies 40 as shown in the drawings. Each pair of wheel assemblies 40 for the back end of cart 32' are mounted directly onto the vertical legs of the side angles in the same manner as with cart 32. The cart 32 is constructed and arranged so that the plates 31A' supporting the front wheel assemblies 40 are arranged to space the front wheel assemblies from the top support surface I of cart 32' an amount greater than such spacing of the rear wheel assemblies 40 as is apparent from a consideration of FIG. 18. By this arrangement, cart 32' has its top support surface I positioned to be level even though the cart 32' moves along an inclined track means 20 and 22 between its forward and back positions.

The cart 32' is provided with a different type of bumper engaging stop than that provided for cart 32. To this end, there is shown in FIG. 20 that there is provided a plate 33A' which is welded to the vertical leg of the front angle of cart 32'. As shown in FIG. 20, the bumpers 62' are arranged to come into contact with this front plate 33A'. This arrangement provides a somewhat better cushioning than the arrangement shown in FIGS. 1-9 wherein the bumpers 62 come into contact with the wheel assemblies 40.

In FIG. 19 there is shown an upper cart 42' which is very similar to the upper cart 42 described above wherefore corresponding parts have been given the same reference numerals with primes added. Upper cart 42' is formed of five structural members which are welded together as discussed above and, including a pair of side structural angles, a front structural tube, a middle structural tube and a rear structural tube arranged as described above with respect to cart 42. The side angles of cart 42' are slightly longer than the side angles of cart 32' as is the case with carts 32 and 42 described above. Also, cart 42' is wider than cart 32'. The horizontal legs of the five structural members forming cart 42' are aligned in the same plane to provide a flat top support surface II for a pallet to be loaded thereon. A pair of bearing-type wheel assemblies 40 are mounted on each side angle of cart 42' to provide four rolling supports therefor. Upper cart 42' is adapted to be mounted into a pair of associated track means 20 and 22 in the same manner as upper cart 42 as described above. Thus, the upper cart wheel assemblies 40 ride on the tapered outwardly facing bottom flange portion of the I-shaped channel members forming the track means 20 and 22 in the same manner as with cart 42 described above.

In accordance with the alternate cart design shown in FIG. 19, the support means for the upper cart wheel assemblies 40 are constructed and arranged so that the front end of the top support surface II of cart 42' is spaced from the place of rolling contact with the track means 20 and 22 an amount greater than that of the back end thereof such that said top support surface II is maintained in a horizontal plane while the cart 42 is supported on the inclined track means 20 and 22. To this end, each of the pair of wheel assembles 40 at the front end of cart 42' are mounted on the side angles thereof by an angle 41A' welded to the vertical leg of the side angles. Also, each pair of wheel assemblies 40 at the back end of cart 42' are mounted on the side angles thereof by an angle 41B' welded to the vertical leg of said side angles. As is shown in FIG. 19, the angles 41A' are longer in length than the angles 41B' and the wheel assemblies 40 are mounted thereon at locations such that support surface II of cart 42' remains level even though the cart 42' moves along an inclination as it moves between its front and back positions on track means 20 and 22.

The cart 42' also has a different type of bumper engaging stop. The stop comprises a leg 43A' of angle 41A' and is best shown in FIG. 20. Leg 43A' and bumpers 62' are arranged such that the bumpers 62' come into contact with the legs 43A' as shown in FIG. 20. The arrangement is such that there is provided better cushioning with the arrangement shown in FIG. 20 than with the arrangement shown in FIGS. 1-9 wherein the bumpers 62 engage the wheel assemblies 40 directly. It is also noted that the embodiment shown in FIG. 19, wherein the angles 41A' and 41B' are used on the outside of the cart 42', provides a design which strengthens the vertical legs of the cart 42' that mount the wheel assemblies 40. This improves the carts' capability of withstanding the constant impact or abuse of pallet loads dropping onto the cart during the use of the storage racks.

While there have been shown as described what are considered preferred forms of the invention, it will be understood that obvious changes in form can be made without departing from the spirit of the invention and it is therefore intended that the invention be not limited to precise forms herein formed and described and that the invention is to be construed broadly and restricted by the following appended claims.

What is claimed is:

1. In a storage rack system for pallet loads having a framework providing a plurality of storage bays each of which is defined by a plurality of vertical uprights and horizontal shelf beams, each of said storage bays comprising
a pair of track means extending from front to back along the depth of said storage bay and being spaced apart across the width of said storage bay,
a lower cart movable along said track means between a forward position and a back position and including a frame providing support from a loaded pallet, said lower cart frame having a pair of sides made of a structural member having a straight undeformed vertical leg, a pair of wheel assemblies on each side of said lower cart frame, and means for supporting each of said lower cart wheel assemblies on said vertical leg of one of said sides of said lower cart frame so that the pair of lower cart wheel assemblies on one side of said lower cart frame are guided by and make good rolling contact with a first guide means of one of said track means as said lower cart moves along the depth of the storage bay between said forward and back positions thereof and so that said pair of lower cart wheel assemblies on the other side of said lower cart frame are guided by and make good rolling contact with a first guide means of the other of said track means as said lower cart moves along the depth of the storage bay between said forward and back positions thereof, each of said lower cart wheel assembly supporting means being fixedly secured directly to said vertical leg of said lower cart frame structural member so that the load transmitted to each of said lower cart wheel assemblies from said lower cart frame is directed in a vertical direction through said vertical leg, and an upper cart movable along said track means between a forward position and back position and including a frame providing support for a loaded pallet, said upper cart frame having a pair of sides made of a structural member having a straight undeformed vertical leg, a pair of wheel assemblies on each side of said upper cart frame, and means for supporting each of said upper cart wheel assemblies on said vertical leg of one of said sides of said upper cart frame so that the pair of upper cart wheel assemblies on one side of said upper cart frame are guided by and make good rolling contact with a second guide means of said one track means as said upper cart moves along the depth of the storage bay between said forward and back positions thereof, said vertical leg of said side of said upper cart frame having a straight undeformed vertical extension, each of said upper cart wheel assembly supporting means being fixedly secured directly to said vertical extension so that the load transmitted to each of said upper cart wheel assemblies from said upper cart frame is directed in a vertical direction through said vertical extension, said forward positions of both said lower cart and said upper cart being located at the entry end of the storage bay, said back position of said lower cart being located two pallets deep from the entry end of the storage bay, and said back position of said upper cart being located three pallets deep from the entry end of the storage bay, said pair of track means being mounted on said storage bay framework, so as to be inclined toward the entry end of said storage bay so that said lower cart and said upper cart are supported so that they tend to roll along said track means toward the entry end of said storage bay, each of said track means comprising a channel means defining a first channel providing said first guide means arranged so that said first guide means of each track means face inwardly toward one another, and channel means defining a second channel providing said second guide means so that the second guide means of each track means face outwardly away from one another, said channel means of each track means comprising a channel member having an I-shaped cross-section including a vertically extending web portion, a horizontally extending lower flange portion and a horizontally extending upper flange portion, said lower flange portion of each of said channel members including a first tapered portion forming part of said first channel and arranged to provide an upwardly facing rolling surface which is inclined at a small angle to the horizontal and a second tapered portion forming part of said second channel and arranged to provide an upwardly facing rolling surfaced which is inclined at a small angle to the horizontal.

2. A storage rack system according to claim 1 wherein each of said wheel assemblies comprises an axle, an annular wheel rim and rolling bearing means for rotatably mounting said wheel rim on said axle.

3. A storage rack system according to claim 2 wherein said means for supporting each of said lower cart wheel assemblies on said sides of said lower cart frame are constructed and arranged so that the rolling surface of said wheel rims ride on said first tapered portions of said lower flange portions of said channel members, and said means for supporting each of said upper cart wheel assemblies on said sides of said upper cart frame are constructed and arranged so that the rolling surface of said wheel rims ride on said second tapered portions of said lower flange portions of said channel members.

4. A storage rack system according to claim 3 wherein each of said wheel assemblies is mounted so that said axle thereof extends on a horizontal axis, said wheel rims being tapered to provide a rolling surface which extends at an angle to the axis of rotation thereof and approximating said inclined angle of said lower flange portions whereby the rolling surface of said wheel rims make good rolling contact with said rolling surfaces of said channel members.

5. A storage rack system according to claim 3 wherein each of said wheel assemblies is mounted on said sides of said carts by a means of a pair of wedge members constructed and arranged to support said axle thereof so that it extends on an axis at an angle to the horizontal and said wheel rims provide a rolling surface concentric with said axis of said axle, said angle of said axles approximating said inclined angle of said lower flange portions.

6. In a storage rack system for pallet loads having a framework providing a plurality of storage bays each of which is defined by a plurality of vertical uprights and horizontal shelf beams, each of said storage bays comprising a pair of track means extending from front to back along the depth of said storage bay and being spaced apart across the width of said storage bay, a lower cart movable along said track means between a forward position and a back position and including a frame providing support for a loaded pallet, said lower cart frame having a pair of sides made of a structural member having a straight undeformed vertical leg, a pair of wheel assemblies on each side of said lower cart frame, and means for supporting each of said lower cart wheel assemblies on said vertical leg of one of said sides of said lower cart frame so that the pair of lower cart wheel assemblies on one side of said lower cart frame are guided by and make good rolling contact with a first guide means of one of said track means as said lower cart moves along the depth of the storage bay between said forward and back positions thereof and so that said pair of lower cart wheel assemblies on the other side of said lower cart frame are guided by and make good rolling contact with a first guide means of the other of said track means as said lower cart moves along the depth of the storage bay between said forward and back positions thereof, each of said lower cart wheel assembly supporting means being fixedly secured directly to said vertical leg of said lower cart frame structural member sop that the load transmitted to each of said lower cart wheel assemblies from said lower cart frame is directed in a vertical direction through said vertical leg, and an upper cart movable along said track means between a forward position and back position and including a frame providing support for a loaded pallet, said upper cart frame having a pair of sides made of a structural member having a straight undeformed vertical leg, a pair of wheel assemblies on each side of said upper cart frame, and means for supporting each of said upper cart wheel assemblies on said vertical leg of one of said sides of said upper cart frame so that the pair of upper cart wheel assemblies on one side of said upper cart frame are guided by and make good rolling contact with a second guide means of said one track means as said upper cart moves along the depth of the storage bay between said forward and back positions thereof, said vertical leg of said side of said upper cart frame having a straight undeformed vertical extension, each of said upper cart wheel assembly supporting means being fixedly secured directly to said vertical extension so that the load transmitted to each of said upper cart wheel assemblies from said upper cart frame is directed in a vertical direction through said vertical extension, said forward positions of both said lower cart and said upper cart being located at the entry end of the storage bay, said back position of said lower cart being located two pallets deep from the entry end of the storage bay, and said back position of said upper cart being located three pallets deep from the entry end of the storage bay, said pair of track means being mounted on said storage bay framework so as to be inclined toward the entry end of said storage bay so that said lower cart and said upper cart are supported so that they tend to roll along said track means toward the entry end of said storage bay, each of said carts having a bumper plate mounted on the forward end thereof including bumper means associated with each of said lower cart and said upper cart, said bumper means being mounted on the framework of said storage bay in a position to contact said bumper plate of said carts and limit the movement thereof toward the entry end of said storage bay at a location whereby said carts are arrested in their forward positions.

7. In a storage rack system for pallet loads having a framework providing a plurality of storage bays each of which is defined by a plurality of vertical uprights and horizontal shelf beams, each of said storage bays comprising a pair of track means extending from front to back along the depth of said storage bay and being spaced apart across the width of said storage bay, a lower cart movable along said track means between a forward position and a back position and including a frame providing support for a loaded pallet, a pair of wheel assemblies on each side of said lower cart frame, and means for supporting each of said lower cart wheel assemblies so that the pair of lower cart wheel assemblies on one side of said lower cart frame are guided by and make good rolling contact with a first guide means of one of said track means as said lower cart moves along the depth of the storage bay between said forward and back positions thereof and so that said pair of lower cart wheel assemblies on the other side of said lower cart frame are guided by and make good rolling contact with a first guide means of the other of said track means as said lower cart moves along the depth of the storage bay between said forward and back positions thereof, and an upper cart movable along said track means between a forward position and back position and including a frame providing support for two loaded pallets, a plurality of wheel assemblies on each side of said upper cart frame, and means for supporting each of said upper cart wheel assemblies so that the plurality of upper cart wheel assemblies on one side of said upper cart frame are guided by and make good rolling contact with a second guide means of said on track means as said upper cart moves along the depth of the storage bay between said forward and back position thereof and so that said plurality of upper cart wheel assemblies on the other side of said upper cart frame are guided by and make good rolling contact with a second guide means of said other of said track means as said upper cart moves along the depth of the storage bay between said forward and back positions thereof, said upper cart frame being of a length about twice as long as said lower cart frame so as to be able to support two pallets of a size that form a full lengthwise load on said lower cart frame, said forward positions of both said lower cart and said upper cart being located at the entry end of the storage bay, said back position of said lower cart being located two pallets deep from the entry end of the storage bay, and said back position of said upper cart being located to encompass three and four pallets deep from the entry end of the storage bay, said pair of track means being mounted on said storage bay framework so as to be inclined toward the entry end of said storage bay so that said lower cart and said upper cart are supported so that they tend to roll along said track means toward the entry end of said storage bay.

8. A storage rack system according to claim 7 wherein there are provided at least four wheel assemblies on each side of said upper cart frame.

9. A storage rack system according to claim 7 wherein each of said track means comprises a channel means defining a first channel providing said first guide means arranged so that said first guide means of each track means face inwardly toward one another, and channel means defining a second channel providing said second guide means so that the second guide means of each track means face outwardly away from one another.

10. A storage rack system according to claim 9 wherein said channel means of each track means comprises a channel member having an I-shaped cross-section including a vertically extending web portion, a horizontally extending lower flange portion and a horizontally extending upper flange portion.

11. In a storage rack system for pallet loads having a framework providing a plurality of storage bays each of which is defined by a plurality of vertical uprights and horizontal shelf beams, each of said storage bays comprising
  a pair of track means extending from front to back along the depth of said storage bay and being spaced apart across the width of said storage bay,
  a lower cart movable along said track means between a forward position and a back position and including
  a frame providing support for a loaded pallet, a pair of wheel assemblies on each side of said lower cart frame, and means for supporting each of said lower cart wheel assemblies so that the pair of lower cart wheel assemblies on one side of said lower cart frame are guided by and make good rolling contact with a first guide means of one of said track means as said lower cart moves along the depth of the storage bay between said forward and back positions thereof and so that said pair of lower cart wheel assemblies on the other side of said lower cart frame are guided by and make good rolling contact with a first guide means of the other of said track means as said lower cart moves along the depth of the storage bay between said forward and back positions thereof, and
  a middle cart movable along said track means between a forward position and a back position and including
  a frame providing support for a loaded pallet, a pair of wheel assemblies on each side of said middle cart frame, and means for supporting each of said middle cart wheel assemblies so that the pair of middle cart wheel assemblies on one side of said middle cart frame are guided by and make good rolling contact with a second guide means of one of said track means as said middle cart moves along the depth of the storage bay between said forward and back positions thereof and so that said pair of middle cart wheel assemblies on the other side of said middle cart frame are guided by and make good rolling contact with a second guide means of the other of said track means as said middle cart moves along the depth of the storage bay between said forward and back positions thereof, and
  an upper cart movable along said track means between a forward position and back position and including
  a frame providing support for a loaded pallet, a pair of wheel assemblies on each side of said upper cart frame, and means for supporting each of said upper cart wheel assemblies so that the pair of upper cart wheel assemblies on one side of said upper cart frame are guided by and make good rolling contact with a third guide means of said one track means as said upper cart moves along the depth of the storage bay between said forward and back position thereof and so that said pair of upper cart wheel assemblies on the other side of said upper cart frame are guided by said other of said track means as said upper cart moves along the depth of the storage bay between said forward and back positions thereof, said forward positions of said lower cart, said middle cart and said upper cart being located at the entry end of the storage bay, said back position of said lower cart being located two pallets deep from the entry end of the storage bay, said back position of said middle cart being located three pallets deep from the entry end of the storage bay and said back position of said upper cart being located four pallets deep from the entry end of the storage bay, said pair of track means being mounted on said storage bay framework at substantially the same elevation and so as to be inclined toward the entry end of said storage bay so that said carts are supported so that they tend to roll along said track means toward the entry end of said storage bay.

12. In a storage rack system for pallet loads having a framework providing a plurality of storage bays each of which is defined by a plurality of vertical uprights and horizontal shelf beams, each of said storage bays comprising
  a pair of track means extending from front to back along the depth of said storage bay and being spaced apart across the width of said storage bay,
  a lower cart movable along said track means between a forward position and a back position and including
  a frame providing support for a loaded pallet, a pair of wheel assemblies on each side of said lower cart frame, and means for supporting each of said lower cart wheel assemblies so that the pair of lower cart wheel assebblies on one side of said lower cart frame are guided by and make good rolling contact with a first guide means of one of said track means as said lower cart moves along the depth of the storage bay between said forward and back positions thereof and so that said pair of lower cart wheel assemblies on the other side of said lower cart frame are guided by and make good rolling contact with a first guide means of the other of said track means as said lower cart moves along the depth of the storage bay between said forward and back positions thereof, and
  a middle cart movable along said track means between a forward position and a back position and including
  a frame providing support for a loaded pallet, a pair of wheel assemblies on each side of said middle cart frame, and means for supporting each of said middle cart wheel assemblies so that the pair of middle cart wheel assemblies on one side of said middle cart frame are guided by and make good rolling contact with a second guide means of one of said track means as said middle cart moves along the depth of the storage bay between said forward and back positions thereof and so that said pair of middle cart wheel assemblies on the other side of said middle cart frame are guided by and make good rolling contact with a second guide means of the other of said track means as said middle cart moves along the depth of the storage bay between said forward and back positions thereof, and an upper cart movable along said track means between a forward position and back position and including a frame providing support for a loaded pallet, a pair of wheel assemblies on each side of said upper cart frame, and means for supporting each of said upper cart wheel assemblies so that the pair of upper cart wheel assemblies on one side of said upper cart frame are guided by and make good rolling contact with a third guide means of said one track means as said upper cart moves along the depth of the storage bay between said forward and back position thereof and so that said pair of upper cart wheel assemblies on the other side of said upper cart frame are guided by and make good rolling contact with a third guide means of said other of said track means as said upper cart moves along the depth of the storage bay between said forward and back positions thereof, said forward positions of said lower cart, said middle cart and said upper cart being located at the entry end of the storage bay, said back position of said lower cart being located two pallets deep from the entry end of the storage bay, said back position of said middle cart being located three pallets deep from the entry end of the storage bay and said back position of said upper cart being located four pallets deep from the entry end of the storage bay, said pair of track means being mounted on said storage bay framework so as to be inclined toward the entry end of said storage bay so that said carts are supported so that they tend to roll along said track means toward the entry end of said storage bay, each of said track means comprising a channel means defining a first channel providing said first channel providing said first guide means arranged so that said first guide means of each track means face inwardly toward one another, channel means defining a second channel providing said second guide means so that the second guide means of each track means face outwardly away from one another, and channel means defining a third channel providing said third guide means so that the third guide means of each track means face inwardly toward one another.

13. A storage rack system according to claim 12 wherein said channel means of each track means defining said first and second channels comprises a channel member having an I-shaped cross-section including a vertically extending web portion, a horizontally extending lower flange portion and a horizontally extending upper flange portion.

14. A storage rack system according to claim 13 wherein said channel means of one of said track means defining said third channel comprises a channel member having an I-shaped cross-section to provide one channel facing inwardly to provide said third guide means and a second channel facing outwardly for use in guiding a cart guided by a track means adjacent said pair of track means.

* * * * *